United States Patent [19]

Trudeau

[11] 3,713,706
[45] Jan. 30, 1973

[54] GRAVITY-ACTUATED SELF-PROPELLING WHEEL CONSTRUCTION

[76] Inventor: Aime Trudeau, 227 N. E. 26th Street, Miami, Fla. 33142

[22] Filed: July 12, 1971

[21] Appl. No.: 162,025

Related U.S. Application Data

[63] Continuation-in-part of Ser. No. 13,522, Jan. 24, 1970, Pat. No. 3,633,979.

[52] U.S. Cl. .............................. 305/7, 301/5 R, 301/7
[51] Int. Cl. .............................................. B62d 57/00
[58] Field of Search .......... 305/6, 7; 301/5, 7; 180/10

[56] References Cited

UNITED STATES PATENTS 1,578,200  3/1926  Matz ........................................ 305/7

3,633,979  1/1972  Trudeau ................................. 305/7

Primary Examiner—Richard J. Johnson
Assistant Examiner—Reinhard Eisenzopf
Attorney—Ernest H. Schmidt

[57] ABSTRACT

An inner wheel having a polygonal periphery is arranged for planetary motion within and with respect to the inner polygonal periphery of an annular outer wheel of substantially greater inner diameter than the outer diameter of the inner wheel. The inner wheel is journalled with respect to a carriage structure whereby, upon the carriage structure being propelled either forwardly or backwardly, the inner wheel rides up within the outer wheel to impose a gravitational force therebetween aiding in the propulsion of the carriage structure.

1 Claim, 3 Drawing Figures

PATENTED JAN 30 1973 3,713,706

INVENTOR
AIME TRUDEAU
BY Ernest H. Schmidt
ATTORNEY.

GRAVITY-ACTUATED SELF-PROPELLING WHEEL CONSTRUCTION

This application is a continuation-in-part of my patent application Ser. No. 13,522, filed Jan. 24, 1970, titled GRAVITY-ACTUATED SELF-PROPELLING WHEEL CONSTRUCTION, issued Jan. 11, 1972 as U.S. Pat. No. 3,633,979.

This invention relates to wheels and is directed particularly to an improved carriage or vehicular wheel wherein the weight of the carriage or vehicle and its load being drawn will impose a gravitational force which aids in the propulsion of the vehicle.

It is the principal object of this invention to provide an improved wheel construction of the above nature wherein the carriage structure and its load, instead of imposing their gravitational force directly over the rotary axle of the wheel, as in the case of ordinary wheel and axle construction, impose their force somewhat forwardly thereof in the direction the carriage structure is being moved, thereby aiding in the propulsion by imparting a torsional force to the instantaneous axis of an outer wheel the outer periphery of which rides along the ground.

A more particular object of the invention is to provide a self-propelling wheel construction of the above nature comprising a symmetrical inner wheel having a polygonal periphery or outer rim portion, and a substantially annular outer wheel the inner periphery of which is symmetrical and of polygonal configuration, the inner diameter of the outer wheel being substantially greater than the outer diameter of the inner wheel, wherein the inner wheel is constrained to mutually planetary motion within the annular outer wheel so that as the carriage structure is drawn, the inner wheel will have a tendency to ride up within the outer wheel to shift the imposition of carriage structure and load force forwardly of the instantaneous rotative axis of the annular outer wheel.

Still another object of the invention is to provide an improved wheel construction of the above nature wherein the polygonal outer rim of the inner wheel will intermeshingly engage with the polygonal inner circumference of the substantially annular outer wheel for improved traction therebetween during their mutual planetary motion upon propulsion of the carriage structure.

Still another object of the invention is to provide an improved wheel construction of the character described which will be simple in structure, economical to manufacture, dependable in operation and durable in use.

Other objects, features and advantages of the invention will be apparent from the following description when read with reference to the accompanying drawings. In the drawings, wherein like reference numerals denote corresponding parts in each of the several views.

Referring now in detail to the drawings, 10 designates a preferred form of gravity-actuated self-propelling wheel embodying the invention, said wheel being journalled on axle 11 the outer ends of which are supported by a pair of laterally-spaced, elongated support members 12, 13 extending forwardly of the underside of a wheelbarrow pan 14 of a wheelbarrow indicated at 15 (partially illustrated). While I illustrate and described herein my improved wheel construction as applied to a wheelbarrow, such use is presented by way of example only. It will be apparent that my invention can be applied as well to a wide variety of self-propelled or manually-propelled vehicular or carriage structures for moving, propelling or transporting people, merchandise or materials from place to place.

Figure 1:
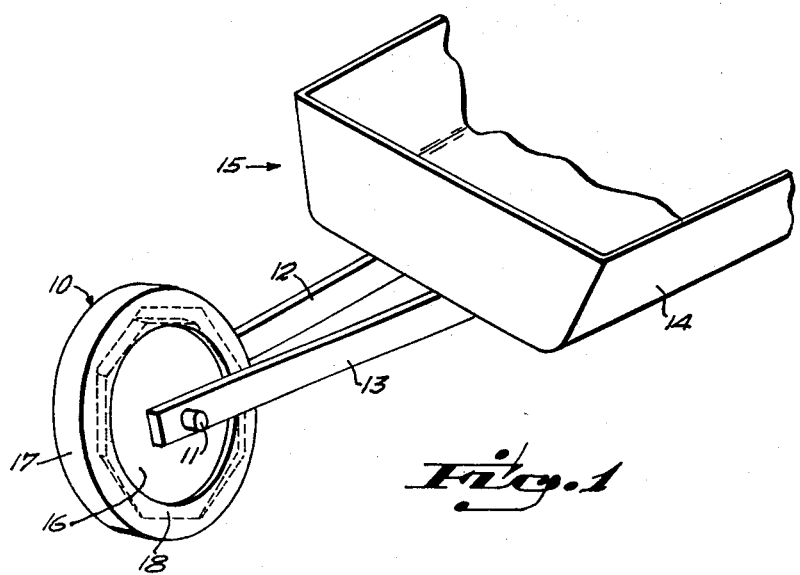
FIG. 1 is a perspective view of a wheelbarrow equipped with a gravity-actuated self-propelling wheel embodying the invention, a portion of the wheelbarrow carriage structure being broken away.
Figure 2:
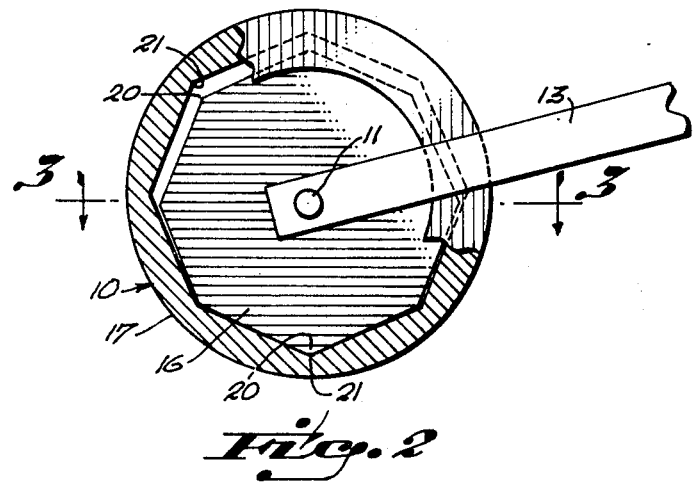
FIG. 2 is a side elevational view of the wheel and a portion of its axle support structure, a portion of the outer, substantially annular wheel being broken away to show constructional details.
Figure 3:
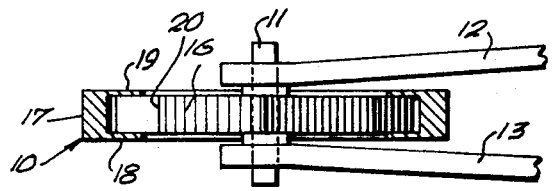
FIG. 3 is a horizontal cross-sectional view taken along the line 3—3 of FIG. 2 in the directional of the arrows.

The self-propelling wheel 10 comprises an inner wheel 16 the outer periphery or rim of which is of symmetrical polygonal configuration, being octagonal in the embodiment illustrated. The inner wheel 16 is disposed within an outer, substantially annular wheel 17 the inner periphery of which is of symmetrical octagonal shape of somewhat greater inner diameter than the outer diameter of the inner wheel 16. As best illustrated in FIGS. 2 and 3, the inner and outer wheels 16 and 17, respectively, are arranged in coplanar disposition for mutual planetary motion, as is hereinbelow described. As means for maintaining the inner and outer wheels 16 and 17 in relatively coplanar disposition, the opposing side wall portions of said outer wheel are fitted with or integrally formed with radially inwardly-extending annular side wall portions 18, 19 the inner diameters of which are substantially less than the diameter of the inner wheel 16. As such, they serve to "cage" the inner wheel with respect to the outer wheel and thereby constrain them to coplanar or mutually planetary movement.

In operation, pushing forwardly on the wheelbarrow 15, for example, will move the inner wheel forwardly within the outer wheel 17, whereupon it will have a tendency to ride up within the inner periphery of the outer wheel 17. As a result, the application of the weight of the wheelbarrow 15 and its load will be shifted upwardly and forwardly of the very bottom of the annular outer wheel 17, forcing said outer wheel to turn in the forward direction. Such turning of the outer annular wheel 17 serves to impel the wheelbarrow 15 forwardly until rest position obtains again, whereat the vertical radii of the inner and outer wheel 16 and 17 will be coincident.

However, during the time that the annular outer wheel 17 begins to move forwardly as described above, the operator of the wheelbarrow 15 will have pushed the axle 11 forwardly to continuously maintain the inner wheel 16 at a relatively forward and upward position with respect and within the annular outer wheel, whereat the load or weight of the wheelbarrow will be able to exert, through force of gravity, its forward impelling influence. Since the application of wheelbarrow load will remain as a force somewhat forward of the vertical plane to ground from the axis of the wheel axle 11, any tendency of the bottom portion of the annular outer wheel 17 to press into the surface along which the wheelbarrow is being moved will be minimized, and rolling friction thereby reduced. In this connection it will be noted that the invention is particularly well suited to use in traveling over soft road surfaces, such as soft dirt or mud.

In its forward and upward planetary movement of the inner wheel 16 within the annular outer wheel 17 as described above, the angular apices 20 defined by the octagonal periphery of said inner wheel serve as teeth engageable within substantially complemental obtuse angular recesses 21 defined by the octagonal configuration of the inner periphery of said outer wheel. Such construction provides for gear-like intermeshing of the inner wheel 16 within the substantially annular outer wheel 17 during propulsion of the wheelbarrow, thereby preventing any substantial slippage of said inner wheel with respect to said outer wheel during their cooperative motion as hereinabove described.

Operation of the wheel 10 in the reverse direction or upon pulling backwardly upon the wheelbarrow 15 will be the same as described above in connection with forward travel.

While I have illustrated and described herein a wheel embodying the invention applied to an ordinary wheelbarrow, it is to be understood that this is done for simplicity of description only, and that the invention could be applied as well to other rolling structures, carriages or vehicles, whether designed for self-propulsion, towing or pushing. The invention, in brief, comprehends all the embodiments and modifications coming within the scope and spirit of the following claims.

What I claim as new and desire to secure by Letters Patent is:

1. A gravity-actuated self-propelling wheel comprising, in combination, an inner wheel having a polygonal peripheral edge portion, a substantially annular outer wheel having an inner peripheral edge portion of polygonal configuration, the inner diameter of said outer wheel being greater than the outer diameter of said inner wheel, said inner wheel being arranged in coplanar disposition within said annular outer wheel, and means interacting between said inner wheel and said annular outer wheel for constraining said inner wheel to planetary movement within said annular outer wheel, said inner and outer interacting means comprising opposed annular side wall portions extending radially inwardly of each side of said outer annular wheel and defining circular openings the diameters of which are substantially less than the diameter of the inner wheel, whereby said inner wheel will be caged with respect to said outer annular wheel, said polygonal peripheral edge portions of said inner wheel and said annular outer wheel being octagonal in shape and symmetrical about their respective rotary axes.

* * * * *